(12) United States Patent
Zereshkian et al.

(10) Patent No.: US 9,812,027 B2
(45) Date of Patent: Nov. 7, 2017

(54) ANTI-CHEATING DEVICE FOR ONLINE EXAMINATION

(71) Applicants: Gholam Hossein Zereshkian, Richmond Hill (CA); Gal Messinger, Richmond Hill (CA)

(72) Inventors: Gholam Hossein Zereshkian, Richmond Hill (CA); Gal Messinger, Richmond Hill (CA)

( * ) Notice: Subject to any disclaimer, the term of this patent is extended or adjusted under 35 U.S.C. 154(b) by 16 days.

(21) Appl. No.: 15/063,609

(22) Filed: Mar. 8, 2016

(65) Prior Publication Data
US 2017/0263142 A1 Sep. 14, 2017

(51) Int. Cl.
*G09B 7/06* (2006.01)
*G06K 9/00* (2006.01)
*G06F 3/147* (2006.01)
*G02B 27/01* (2006.01)

(52) U.S. Cl.
CPC ............ *G09B 7/06* (2013.01); *G02B 27/017* (2013.01); *G06F 3/147* (2013.01); *G06K 9/00604* (2013.01); *G06K 9/00617* (2013.01); *G02B 2027/0178* (2013.01)

(58) Field of Classification Search
CPC ......... G09B 7/06; G02B 27/017; G06F 3/147; G06K 9/00604; G06K 9/00617
See application file for complete search history.

(56) References Cited

U.S. PATENT DOCUMENTS

2016/0248767 A1* 8/2016 Le ......................... H04L 63/102

* cited by examiner

*Primary Examiner* — Kevin M Nguyen
(74) *Attorney, Agent, or Firm* — Nasser Ashgriz UIPATENT Inc.

(57) ABSTRACT

The present invention discloses an anti-cheating system in online examinations. The system includes a personalized eye recognition device comprising of a monitor and an eye recognition technology connected to a computer, on which a student may take a test. The eye recognition device has a verification module for verify the examinee according to a set of verification data. The eye-monitor would display the answers only if the glass is on the eye of the right person. The eye recognition device comprises of an optical imager that obtains the image of the user's iris, and then compares it with a previously obtained and stored image of the user's iris. The present anti-cheating examination system further comprises a video camera to collect and transmit images of the examinee to an identity recognition system, a computer device to provide questions and answer keys thereon and a microphone for voice recognition and check the background voices and control the examination environment voices.

12 Claims, 3 Drawing Sheets

ANTI-CHEATING DEVICE FOR ONLINE EXAMINATION

FIELD OF THE INVENTION

The present invention relates in general to anti-cheating systems in online examination and in particular to an anti-cheating system and method by providing an eye recognition technology and eye display to a verified examinees.

BACKGROUND OF THE INVENTION

Online education has become a common practice and it has replaced a large percentage of traditional classroom education. Although the traditional direct teacher-student interaction has a superior educational value, it is difficult to apply when issues such as a large number of students, high cost of organizing a class, a wide geographical distribution of students, and other factors arise. Organizing a class also requires preparation of test questions and test papers, preparation of answer sheets, graders and grading, and publication of the results, all requiring personnel. Online education together with proper technologies is a good alternative for traditional classroom education and issues associated with it.

Information technology means are used in online education as the core of distance education and training in all levels, such as in public institutions, educational and research institutions and colleges. Preserving the veracity of student learning assessment is as much of a priority for online courses as it is for traditional face-to-face instruction. Although there is a concern that academic cheating might be more likely to happen in an online exam. Online exams can be completely paperless and fully automated, which are some of the practical values of information technology.

Online exams may contain a variety of college and university tests, graduate engineering exams, medical school exams, occupational exam, college English exams and other important exams.

The present online exams still use manual check the identity of the examinees. This method cannot prevent the cheating methods currently conducted. Challenges to prevent cheating in an online setting are somewhat different than in a class room setting since in the former faculty and students are physically separated from each other. This makes it difficult to monitor various types of learning assessment activities.

Generally, online students are not more likely to violate rules than their on-campus counterpart. However, some experts suggest that it is easier to cheat in online learning environments, since students can ask someone to take an exam for them or complete a test with the internet at their fingertips. Therefore, online testing provides better opportunities to cheat.

There are several new technologies that try to stop cheating. Some schools use software that prevents students from opening apps or web browsers during online exams. Others employ services with live exam proctors who monitor students remotely over webcams. Some of institutions use an automated plagiarism detection system called Turnitin, which scans students' papers for copied passages. Some schools have developed their own early warning system, called Stoplight, which uses academic and demographic details about students to predict their likelihood of passing specific courses; as part of the program, professors receive class lists that color-code each student as green, yellow or red.

When students take exams in their own home, it can be hard for school officials to verify their identity. As a result, more schools are hiring companies that provide online proctoring during exams. Through the use of a webcam, employees from the company can watch a student's face and computer screen as he or she takes the test. Before students start the exam, they have to show a proof of identity.

The present invention is a new device and method of examination to prevent examinees of cheating in online examinations.

SUMMARY OF THE INVENTION

According to the present invention, an anti-cheating examination system and method are disclosed. The system includes a computer with a computer-monitor, an eye-monitor and an eye recognition device. Both the eye-monitor and eye recognition device are connected to the computer, on which an examinee may take a test. In addition, the system comprises of computer software that displays only parts of a question on the computer-monitor and parts of it on the eye-monitor. For example, the questions are displayed on the computer-monitor, but the multiple choice answers are displayed on the eye-monitor.

The eye recognition device scans the iris of a wearer of the eye glasses and sends it to the computer.

Eye recognition software on the computer compares the iris scan with a previously stored iris scan of the examinee.

Computer software would display parts of the question on the eye-monitor only if the glasses are on the eye of the verified examinee.

The present anti-cheating examination system further has a video camera to collect and transmit images of the examinee to an identity recognition system to compare the identity of the examinee with the previous information.

The images transmitted by the video camera are also monitored by a central terminal to control the examination environment during the examination. The video camera collects and sends images to determine, for example, how many people are in front of the camera.

After the start of the examination, the eye recognition device verifies the examinee according to a set of verification data. Meanwhile the system will send regular or irregular identification instructions to confirm the identity of the examinee to the central terminal. When the system approves the identification of the examinee, it will enable the examinee to answer the questions. Some parts of the questions or the answers will be displayed only if the glass is on the eye of the right person.

The anti-cheating examination system further has a computer device to provide questions and answer keys thereon. The examinee can see the answers on the eye device, such as a google glass, and then answer the questions on the computer. Again, algorithms are imbedded in the system to display at least parts of the questions and answers only if the right person is wearing the eye device.

The eye recognition device utilizes smart glass technology. Smart glass technology includes a signal receiving means between the smart glass and a signal receiving device connected via a wireless network. The signal receiving device is a wireless computer or any wireless receiver video equipment for direct video audio processing, enabling management within a local range.

The present anti-cheating examination system further has a microphone for voice recognition, to check the background voices and control the examination environment voices.

In every examination, the examinee needs to receive data from the system, pass the recognition system to proceed with the examination.

It is, therefore, an object of the present invention to provide an anti-cheating examination system, to prevent examinee cheating during an online examination.

It is another object of the present invention to provide a personalized eye recognition system to identify the examinee.

It is another object of the present invention to provide an examination system by rearranging the questions and answers of the test by a randomizing module, so as to display different questions and answers on different devices.

It is another object of the present invention to provide an anti-cheating system in which at least parts of questions or answers are displayed only after the examinee is identified.

It is another object of the present invention to provide an anti-cheating system in which the examinee can see at least parts of the questions or answers only on his/her eye-monitor.

Other objects, features, and advantages of the present invention will be readily appreciated from the following description. The description makes reference to the accompanying drawings, which are provided for illustration of the preferred embodiment. However, such embodiments do not represent the full scope of the invention.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

DETAILED DESCRIPTION OF PREFERRED EMBODIMENTS

Figure 1:
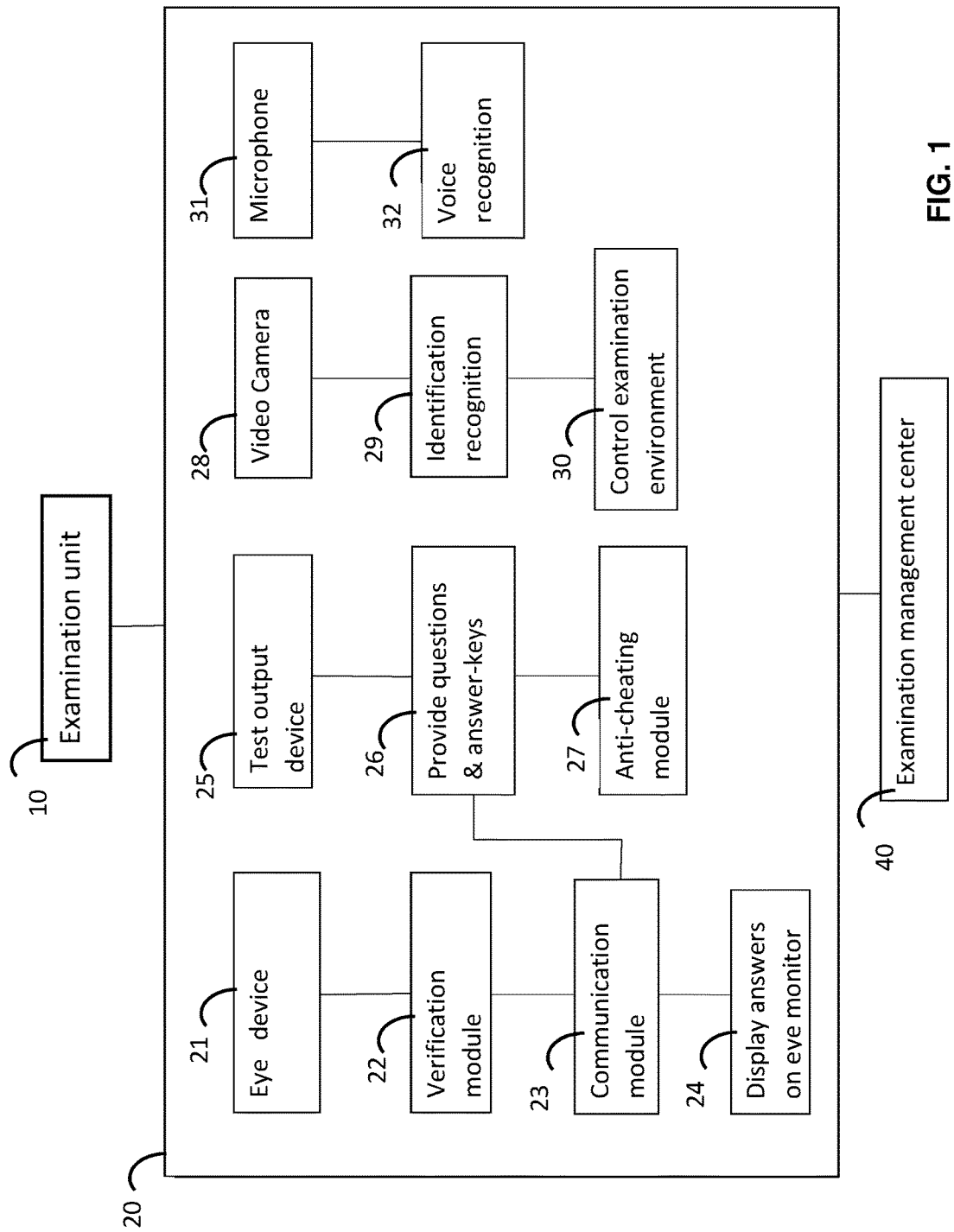
FIG. 1 is a complete network diagram of the anti-cheating system of the present invention

The anti-cheating examination system is based on eye recognition by using an eye glasses having smart technology, such as a google glass. FIG. 1 illustrates the anti-cheating examination according to the present invention. The examination system comprises of an examination unit 10 and a plurality of examination devices 20. The identification information of the examinee is stored in a data base during the registration. The first step is to verify the examinee by an eye recognition device mounted on an eye glass 21 and generate a verification signal by a verification module 22. The verification module is for generating verification data and sending it to the management center 40 to confirm the identity of the examinee. A communication module 23 is provided to store a plurality of questions and related answers and to display the parts of answers 24 on the eye monitor of the eye device 21.

There are currently a wide variety of smart glasses. Smart glasses are wearable computers with monitors that allow the wearer to see that is displayed on its eye monitor. They are also called Digital Eye Glass or Personal Imaging System. Typically this is achieved through an optical head-mounted display (OHMD) or computerized internet-connected glasses with transparent heads-up display (HUD) or augmented reality (AR) overlay that has the capability of reflecting projected digital images as well as allowing the user to see through it, or see better with it. The currently available smart glasses utilize cellular technology or Wi-Fi, to effectively act as a wearable computer. Smart glasses can be handsfree using voice command or have touch buttons.

The smart glasses used in the present system can receive information from a central or a local computer and display such information on its monitor. It can also receive information from other devices, such an iris reader and communicate such information to a central computer. The communication can be through wireless technologies like Bluetooth, Wi-Fi, and GPS, or it can be wired to a local computer.

The anti-cheating examination unit 10 further has a video camera 28 to collect and transmit the images to the identity recognition system 29 and compare the identity of the examinee with the previous information. Video camera 28 is used by the examination unit 10 to control the examination environment 30 during the examination. Said video camera 28 collects and sends images to determine how many people are in front of the camera.

The anti-cheating examination system 10 further has a microphone 31 for voice recognition and background voices 32 and control the examination environment voices.

The examination unit includes a test output device 25. The examination questions and related answer keys 26 are then displayed on the test output device 25 such as a computer device, laptop or tablet. An anti-cheating signal is generated by an anti-cheating module 27 that creates a reply data by the examination unit 10. The answers are then displayed on the monitor of eye device 24. The eye device 21 has a database for storing the answers and a display in which the examinee can see the answers. The examinee then marks the answers on the computer device 25. The eye device 21 displays parts of questions or answers only if the eye device is on the eye of the right person. The answers are then sent to the examination center 40 for generating an examination score.

In every examination process, the examinee receives data from the examination management center 40, gets checked by the eye recognition system before the data are transmitted to the eye device 21.

Figure 2:
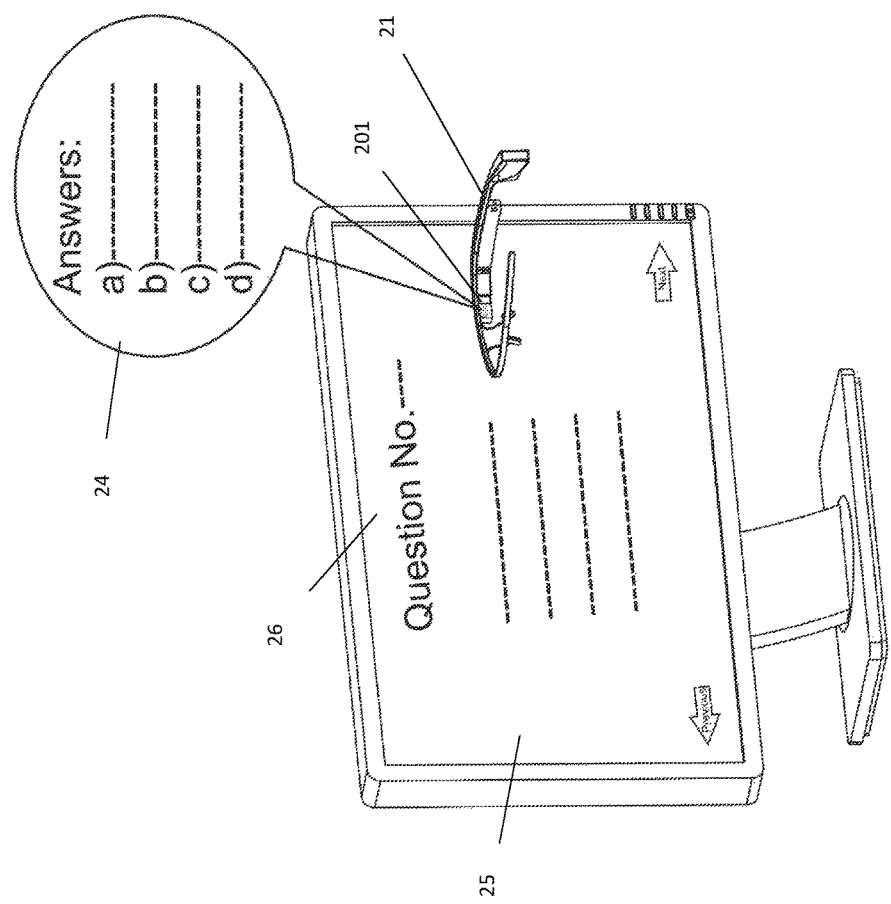
FIG. 2 illustrates a method of anti-cheating examination system.

According to FIG. 2 in an examination the examinee wears the eye device 21. The recognition system collects and transmits the images from verification module of the eye device 21 to the identity recognition system in examination management center. The identity of the examinee is compared with the previous identity information of the examinee. The iris of the examinee is photographed by a video camera and stored in a data base. Plurality means selected from the group consisting of a cable, a Bluetooth and a Wi-Fi communication system connect the eye device to the computer.

Thereafter, a pattern of a currently-inputted iris is compared with that of the stored iris, thereby identifying the user having the currently-inputted iris stored in a data base. After the identity verification, the test output device 25 generates the test data from the database and the examinee receives the questions displayed on the test output device 25 such as a computer device, laptop or tablet. As soon as the examinee reads the questions, the answers appear on the monitor of the eye device 201. The examinee chooses the answer and marks the desired answer on the answer key on the test output device 25. Several mathematical and statistical algorithms are available and provided on the system to display the questions and related answers only if the right person is wearing the eye device 21. The examinee may then select the right answer and answer the questions on the test output device 25.

The anti-cheating examination system further has a video camera 28 to collect and transmit images of the examinee to the identity recognition system. Examinee's images are compared with the previously stored images to identify the examinee. Video camera 28 is also used by the examination unit to control the examination environment during the examination. For example, the video camera collects and sends images to determine how many people are in front of the camera.

The anti-cheating examination system further has a microphone 31 for voice recognition and background voices to monitor the sounds and voices in the examination environment. For example, to make sure no one else is audibly helping the examinee.

When the examinee finishes answering the questions, a reply is sent to the examination management center through a processing unit and a score is generated.

The examinee may start the examination by using the examination device. The examination device would send the identity verification key of the examinee to the examination management center through the communication module for verifying the identity of the examinee. When the examination management center verifies the identity of the examinee, the test data is then generated from a database by the processing unit.

The test data will be sent to the corresponding examination device. After that, the anti-cheating module of the examination device is activated for controlling the other cheating elements.

Figure 3:
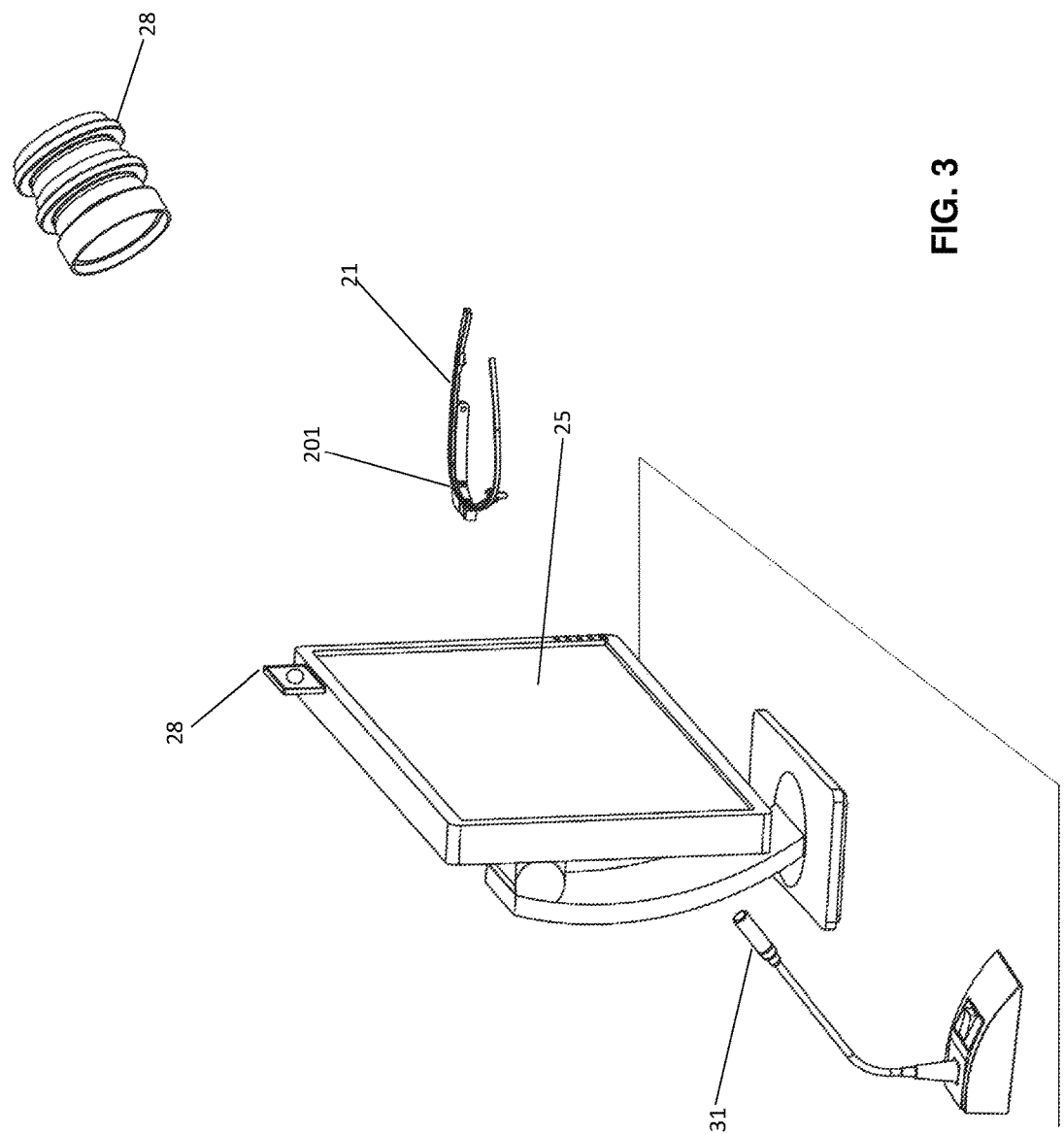
FIG. 3 is a schematic view of the present invention.

According to FIG. 3 the computer-monitor 25 displays the first part of an exam question 26. The an eye-monitor 201 displays the second part of exam question 24, if the wearer is identified as the examinee by comparing iris patterns match is obtained, otherwise do not show blank the second part, and the examination process is stopped as soon as the eye-recognition device does not receive the correct iris pattern from the wearer.

The computer device 25 provides questions and answer keys thereon so that the examinee can see the answers on the eye device, such as a google glass, and then answer the questions on the computer device 25. The first part of the exam question is the statement of the question and the second part is the multiple answer choice.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

What is claimed is:

1. An anti-cheating system for online examination, comprising:
   a computer having a non-transitory computer readable medium, a processor and a computer-monitor to display a first part of an exam question;
   an eye glasses having an eye-monitor to display a second part of said exam question, an eye-recognition device to continuously monitor and obtain the iris-pattern of a wearer of said eye glasses, and said eye glasses having means to connect to said computer;
   a computer readable program to compare the iris-pattern of said wearer with a pre-stored-iris-pattern of an examinee, to display said second part of said exam question on said eye monitor if said wearer is identified as the examinee by comparing iris patterns, otherwise do not display said second part, and to receive an answer for an exam question from said wearer,
   whereby the examination process is stopped as soon as the eye-recognition device does not receive the correct iris pattern from the wearer.

2. The anti-cheating online examination system of claim 1, wherein said means to connect said eye glasses to said computer is selected from the group consisting of a cable, a Bluetooth and a Wi-Fi communication system.

3. The anti-cheating online examination system of claim 1, wherein said first part of said exam question is the statement of said question and said second part is the multiple choices answers.

4. The anti-cheating online examination system of claim 1, wherein said first part of said exam question is the multiple choices answers and said second part is the statement of said question.

5. The anti-cheating online examination system of claim 1, further having a video camera to monitor the examination environment,
   whereby information obtained by said video camera are transmitted to a central terminal to monitor the examination environment during the examination and determine when the examiner is alone.

6. The anti-cheating online examination system of claim 1, further having a microphone to monitor the examination environment,
   whereby information obtained by said microphone are transmitted to a central terminal to monitor the examination environment during the examination and determine when the examiner is alone.

7. The anti-cheating online examination system of claim 1, wherein said eye glasses has a smart glasses technology.

8. The anti-cheating online examination system of claim 1, wherein said eye-recognition device further having an eye motion device to receive commands from said wearer, whereby the wearer picks the correct answer from among a set of multiple choices by moving his eye on his or her choice.

9. An anti-cheating method for online examination comprising steps of:
   obtaining and storing the iris pattern of an examinee in a data base during the registration;
   continuously monitoring the iris pattern of the examinee using a smart glasses that is used by the examinee;
   displaying a first part of an exam question on a computer monitor;
   displaying a second part of the exam question on an eye-monitor only when the wearer of said eye-monitor is identified as the examinee.

10. The anti-cheating method of claim 9, wherein the examinee provides answers on an answer key provided on the computer-monitor.

11. The anti-cheating method of claim 10, wherein the examinee provides answers on an answer key provided on the eye-monitor.

12. The anti-cheating method of claim 10, wherein said computer communicates with a central computer that contains an examinee's information.

\* \* \* \* \*